United States Patent
Saily et al.

(10) Patent No.: US 9,622,125 B2
(45) Date of Patent: Apr. 11, 2017

(54) CONTROLLING RADIO MEASUREMENTS OF A USER EQUIPMENT WITHIN A CELLULAR NETWORK SYSTEM

(75) Inventors: Mikko Saily, Helsinki (FI); Per Henrik Michaelsen, Aalborg (DK); Simone Barbera, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/375,490

(22) PCT Filed: Jan. 30, 2012

(86) PCT No.: PCT/EP2012/051431
§ 371 (c)(1),
(2), (4) Date: Jul. 30, 2014

(87) PCT Pub. No.: WO2013/113355
PCT Pub. Date: Aug. 8, 2013

(65) Prior Publication Data
US 2015/0011219 A1    Jan. 8, 2015

(51) Int. Cl.
*H04W 36/00*    (2009.01)
*H04W 24/10*    (2009.01)

(52) U.S. Cl.
CPC ....... *H04W 36/0088* (2013.01); *H04W 24/10* (2013.01); *H04W 36/0094* (2013.01)

(58) Field of Classification Search
CPC ... H04W 24/02; H04W 36/30; H04W 84/045; H04W 36/0083; H04W 36/04; H04W 16/32

(Continued)

(56) References Cited

U.S. PATENT DOCUMENTS 6,041,235 A  *  3/2000  Aalto ........................... 455/437
8,731,576 B2 *  5/2014  Hamabe et al. ........... 455/452.2
(Continued)

FOREIGN PATENT DOCUMENTS

EP        2 355 579 A1    8/2011
WO    WO 2011/041753 A2    4/2011

OTHER PUBLICATIONS

3GPP TSG-RAN WG2 Meeting #75, Athens, Greece, Aug. 22-26, 2011, R2-114316, "Enhancements for UE Mobility State Estimation", Nokia Siemens Networks, Nokia Corp., 5 pgs.

(Continued)

*Primary Examiner* — Martin Mushambo
(74) *Attorney, Agent, or Firm* — Harrington & Smith

(57) ABSTRACT

It is described a method for controlling radio measurements of a user equipment within a cellular network system, wherein the user equipment is served by a cell of a first cell type characteristic, the cell being assigned to a base station, wherein the cellular network system includes the cell and at least one further cell of a second cell type characteristic. The method includes providing, by the base station, a radio measurement configuration to the user equipment, wherein the radio measurement configuration is indicative for parameters to be applied by the user equipment for radio measurements, the radio measurement configuration includes different parameters being assigned to different cell type characteristics, and controlling the radio measurements of the user equipment based on the provided radio measurement configuration.

18 Claims, 4 Drawing Sheets

(58) Field of Classification Search
USPC .............................................. 455/436, 456.1
See application file for complete search history.

(56) References Cited

U.S. PATENT DOCUMENTS

| | | | |
|---|---|---|---|
| 2003/0109254 A1* | 6/2003 | Motegi et al. ................ | 455/435 |
| 2011/0195708 A1* | 8/2011 | Moberg ............ | H04W 36/0094 |
| | | | 455/424 |
| 2011/0237286 A1* | 9/2011 | Hosono ........................ | 455/515 |
| 2011/0269467 A1* | 11/2011 | Leclerc et al. ................ | 455/436 |
| 2012/0046030 A1* | 2/2012 | Siomina et al. .............. | 455/423 |

OTHER PUBLICATIONS

3GPP TSG-RAN WG2 #75, Aug. 22-26, 2011, Athens, Greece, R2-114219, "Discussion on mobility state detection for HetNet", ITRI, 3 pgs.

\* cited by examiner

RSRP vs. Trajectory for UE-2

RSRP vs. Trajectory for UE-1

CONTROLLING RADIO MEASUREMENTS OF A USER EQUIPMENT WITHIN A CELLULAR NETWORK SYSTEM

FIELD OF INVENTION

The present invention relates to the field of cellular networks and in particular to heterogeneous networks.

ART BACKGROUND

Cellular network systems may be arranged in multi-layer cellular systems—also referred to as heterogeneous networks (HetNet). In this context, multi-layer refers to cases with a mixture of macro base stations and small power base stations (for instance pico and micro). Macro-layer and pico/micro layer may also be implemented in different radio access technologies (RAT), for example GSM macro layer and LTE micro layer.

In such networks, a user equipment (UE) may use a measurement configuration. A measurement configuration defines how the UE will experience its environment and acts as an input to mobility management in connected mode (connected to a base station for an active communication) and autonomously in idle mode (without active communication). Typically, the Physical Cell Identity (PCI) is used to identify a cell for the radio without a need for the UE to read the broadcasted system information. The PCI of a cell is not necessarily a unique network-wide cell identifier. However, the PCI is normally unique on a local scale to avoid collision and/or confusion with neighbouring cells.

In such networks, when the UE is moving, there may be the case where mobility problems for fast moving users are associated with out-bound handovers from small power cell, e.g. handout from pico cell to another pico or macro layer. In the connected mode, the triggering of a measurement report is controlled by a parameter, called TimeToTrigger (TTT), which is the same regardless of the target cell type. In idle mode, triggering a measurement for cell ranking is controlled with two broadcasted parameters, t-Reselection and Qhyst. When the UE is camping in a cell, these parameters may be the same during the measurements, regardless of the target cell type while measuring. Due to generic parameter settings, mobility problems may arise when a handover or a cell reselection is not performed towards the most suitable cell type because the target cell type is not taken into account.

Common measurement configuration setting is not fast enough to reconfigure measurements according to target cell types and the signalling load would not be feasible in heterogeneous network with dense small cells deployments. Also the support for measurement objects is limited where E-UTRAN configures only a single measurement object for a given frequency, i.e. it is not possible to configure two or more measurement objects for the same frequency with different associated parameters. This means that measurement configuration support for different cell types without reconfigurations is not possible.

The measurement configuration may have some flexibility only for fast moving UEs, which can use Mobility State Estimation (MSE) and related mobility parameters scaling. MSE scales down mobility parameters based on the estimated UE velocity and may make fast moving UEs to enter and leave small cells faster. Unfortunately, having UEs connected to small cells at high velocity is quite opposite to what is desired as the target is to improve mobility robustness and one conclusion is to keep fast moving UEs out of small cells.

There may be a need for an improved system and method being adapted to provide flexible radio measurements.

SUMMARY OF THE INVENTION

This need may be met by the subject matter according to the independent claims. Advantageous embodiments of the present invention are described by the dependent claims.

According to a first aspect of the invention there is provided a method for controlling radio measurements of a user equipment within a cellular network system, wherein the user equipment is served by a cell of a first cell type characteristic, the cell being assigned to a base station, wherein the cellular network system comprises the cell and at least one further cell of a second cell type characteristic. The method comprises providing, by the base station, a radio measurement configuration to the user equipment, wherein the radio measurement configuration is indicative for parameters to be applied by the user equipment for radio measurements, the radio measurement configuration comprising different parameters being assigned to different cell type characteristics, and controlling the radio measurements of the user equipment based on the provided radio measurement configuration.

This aspect of the invention is based on the idea to improve the flexibility of radio measurements by taking into account the target cell type characteristic. "Target cell" in this context may refer to the cell, for which the measurements should be carried out. The target cell may also be the target for a following handover. The target cell may also be the cell the user equipment is already connected to, i.e. the "serving cell". The radio measurement configuration may take into account, for choosing the parameters, the serving cell, the target cell or both.

Common systems, for instance E-UTRAN, provide the measurement configuration applicable for a user equipment (UE) in RRC_CONNECTED by means of dedicated signalling, i.e. using the RRCConnectionReconfiguration message. E-UTRAN only configures a single measurement object for a given frequency, i.e. it is not possible to configure two or more measurement objects for the same frequency with different associated parameters, e.g. different offsets and/or blacklists. Measurement object may refer for instance to a specific cell.

The UE maintains a single measurement object list, a single reporting configuration list, and a single measurement identities list. The measurement object list includes measurement objects, which are specified per RAT type, possibly including an intra-frequency object (i.e. the object corresponding to the serving frequency), inter-frequency object(s) and inter-RAT objects.

However, the common systems may provide some disadvantages. Considering the intra-frequency case, when the UE performs measurements towards different cell types, only one measurement configuration is possible. Therefore measurements are limited and not providing flexibility towards different cell types in various heterogeneous network deployments. It is not possible to configure more than one mobility related measurement parameter (for instance TTT, t-Reselection, Qhyst) value per measurement object. The Mobility State Estimation can scale down for example the TTT value in RRC connected mode by factors [0.25, 0.50, 0.75, 1.00], which can make the fast moving UEs to enter small power cells even faster. However, as already explained above, this is not desired. Non-stationary, irregular and/or unpredictable trajectory of users can increase the need for diverse measurement configurations. When only one measurement object is possible for a given frequency, it means that in order to support mobility through a heterogeneous network area, several measurement configurations or reconfigurations needs to be signalled to UE for optimum mobility performance.

The idea of the herein described method is to enhance the measurement configuration and related measurements. The method provides a flexibility to the measurements and can enable support for advanced mobility scenarios especially in areas where heterogeneous networks are deployed.

According to the described method, when camping on a cell or being connected to a cell, the UE may use the enhanced measurement configuration to support measurements of different target cell types with dedicated parameters in connected and idle mode. The measurement configuration may contain a set of dedicated parameters for each different cell type characteristic. Thus, radio measurements towards different target cells of different target cell type characteristics can be done without a measurement reconfiguration process by network.

The described method relates in particular to LTE rel. 11+ and in particular to HetNet measurements, but is not limited to these environments. The described method provides a way to enhance the measurement configuration and related measurements so that different target cell types can be supported with optimized measurement parameters improving the mobility in HetNets. The basic idea is that a UE will be provided with different measurement configuration for different cell types (or at least one for macro cell and another one for small cells).

The term "base station" in this context may denote any kind of physical entity being able to hold one or more cells. A base station in this context may be any kind of network device providing the required functionality for the method; it may also be a transceiver node in communication with a centralized entity. The base station may be for example an eNodeB or eNB.

The term first and second "cell type characteristics" may refer to cell characteristics or properties, wherein the first and the second cell type characteristic may be equal or different.

According to a further embodiment of the invention, controlling the radio measurements comprises configuring the user equipment to apply parameters for radio measurements based on a respective cell type characteristic.

According to this embodiment, after receiving the radio measurement configuration, the UE may be configured in such a way to apply specific parameters for specific radio measurements for specific cell type characteristics. With one radio measurement configuration, the UE may be configured to apply different kind of measurements (i.e., using different parameters), for different cell type characteristics. This may provide a greater flexibility without a need of a complete reconfiguration.

According to a further embodiment of the invention, the method further comprises receiving, by the base station, radio measurements from the user equipment, wherein the radio measurements are based on the provided radio measurement configuration, and scheduling a handover operation of the user equipment from the cell to the further cell based on the transmitted radio measurements.

According to this embodiment, a handover operation may be scheduled based on radio measurements, which have been carried out based on specific parameters for specific cell type characteristics. Thus, an efficient handover may be realized as the radio measurements are adjusted based on the cell type characteristics. Further, the UE may also take into account which cell type characteristic may be preferred for a handover.

According to a further embodiment of the invention, the radio measurement configuration comprises a table having the cell type characteristics and the assigned parameters.

Such a radio measurement configuration table may comprise information about neighbouring cell PCIs (physical cell identity) to be measured and cell type characteristics associated to the PCI respectively. The table may also comprise a set of dedicated mobility parameters for each different cell type characteristic. Preferably, a minimum of two sets of dedicated parameters are given, e.g. parameters for the current/coverage cell (e.g. macro) and for the cell type characteristic relatively smaller than coverage cell (e.g. pico). The dedicated set of mobility parameters can comprise of, but is not limited to, TimeToTrigger (for connected mode), t-Reselection (for idle mode) or Qhyst (for idle mode).

According to a further embodiment of the invention, the cell type characteristics comprise at least one of the group consisting of cell type, cell coverage, cell capacity, cell size, cell weight and cell priority.

The cell type may be defined for instance by macro, micro, pico, femto. The cell coverage may define for instance a region (vertical or horizontal), in which a connection via the cell may be provided for a UE. The cell capacity may define the amount of communications (for multiple UEs, per UE) which may be supported. Cell capacity and cell coverage may also be combined under the term cell deployment. The cell size may define the size of a cell for instance via an enumerated value (e.g., large, medium, small, very small, etc.) or via a numerical absolute value (for instance diameter or perimeter, which may be specified in meter or centimeter). The different cells may also be weighted, for instance via a numerical relative value (e.g., 1.5, 1.0, 0.5, 0.25; i.e., the larger the weight, the higher the priority or vice versa). Such a weight may be specified for instance during the network design. The cell priority may refer to a priority cell status which may be assigned to some cells. This may denote that a cell with a higher priority may be preferred or prioritized over other cells. This may be independent of the size or other properties of the cells.

According to a further embodiment of the invention, the parameters are indicative for the measurement behavior and/or the reporting behavior of the user equipment.

The UE measurement and reporting behavior may be different for the different cell type characteristics of the cells (i.e., may vary from cell to cell) that the UE measures (or at least for the macro and small cells) because parameters controlling measurement reporting may be different for macro and small cells (or different cell types). The parameters may indicate for instance time points for measurements or the manner of the measurements.

According to a further embodiment of the invention, the radio measurement configuration comprises a list comprising information of the at least one further cell and the associated cell type characteristic.

Before carrying out radio measurements, the UE should choose the appropriate radio measurement configuration based on the provided radio measurement configuration. According to this embodiment, the UE has a pre-knowledge about the cell type characteristic of the at least one further cell and can thus choose the appropriate corresponding parameters.

In another embodiment, the UE may receive an information signal from the at least one further cell comprising information about the cell type characteristic before starting radio measurements.

According to a further embodiment of the invention, the list comprises information about a plurality of neighboring cells and the respective associated cell type characteristic.

The UE may have a pre-knowledge about all neighboring cells, including the at least one further cell, based on a neighbour cell list along with cell type characteristics of those cells. This may allow better control of when and how often radio measurements are reported for different type of cells which in turn may allow control of when the UE is handover to a target cell of a specific cell type. This in essence may allow avoiding high speed UEs in small cells which might be important for Hetnet deployment involving macro and small cells.

According to a further embodiment of the invention, controlling the radio measurements of the user equipment is based on the list and the parameters.

The UE may choose the parameters based on the list. Thus, the UE choose a target cell, determines the cell type characteristic of this target cell based on the list and chooses then the respective parameters.

According to a further embodiment of the invention, controlling the radio measurements of the user equipment is based on the provided radio measurement configuration and a classification state of the user equipment.

The UE may take also into account its own classification state when starting radio measurements. This may further improve the flexibility and accuracy of radio measurements.

According to a further embodiment of the invention, the classifications state of the user equipment corresponds to a mobility state and is determined by applying mobility state estimation (MSE).

According to the specified MSE, but not limited to it, two parameters are scaled according to the mobility state (Q_hyst and T_reselection) in idle mode and one parameter (Time-To-Trigger (TTT)) in connected mode. According to 3GPP Release 8, each UE mobility state has its own Speed-StateScaleFactors [0.0, 0.25, 0.75, 1.00], where "1.00" is assumed to equal for "normal mobility state". Scaling factors are applied to the defined parameters whenever the mobility state of the UE changes. Also any other method providing the mobility state or estimate of the mobile activity may be supported.

It should be noted that the "mobility state", for instance a high mobility state, of the UE refers to an illustrative description of the UE mobility behaviour and activity. It may refer for instance to the amount of handovers per time. The mobility state in this context should be distinguished from Release 8 mobility states.

For instance, according to this embodiment, if the UE is classified to high mobility state, the serving cell is characterized as "small" and the target cell (for instance the at least one further cell) to be measured is characterized as "large", then the UE may apply the set of parameter values which are specific for a large target cell type at high mobility state. If the UE is classified to high mobility state, the serving cell is characterized as "large" and the target cell to be measured is characterized as "small", then the UE may apply the set of parameter values which are specific for a small target cell type at high mobility state. In general, the selected parameter value may depend on both the serving and target cell types.

According to a second aspect of the invention, there is provided a base station for controlling radio measurements of a user equipment within a cellular network system, wherein the user equipment is served by a cell of a first cell type characteristic, the cell being assigned to the base station, wherein the cellular network system comprises the cell and at least one further cell of a second cell type characteristic. The base station comprises a transmitting unit being adapted to provide a radio measurement configuration to the user equipment, wherein the radio measurement configuration is indicative for parameters to be applied by the user equipment for radio measurements, the radio measurement configuration comprising different parameters being assigned to different cell type characteristics, and a control unit for controlling the radio measurements of the user equipment based on the provided radio measurement configuration.

The base station may be any type of access point or point of attachment, which is capable of providing a wireless access to a cellular network system. Thereby, the wireless access may be provided for a user equipment or for any other network element, which is capable of communicating in a wireless manner. The base station may be an eNodeB, eNB, home NodeB or HNB, or any other kind of access point.

The base station may comprise a receiving unit, for example a receiver as known by a skilled person. The base station may also comprise a transmitting or sending unit, for example a transmitter. The receiver and the transmitter may be implemented as one single unit, for example as a transceiver. The transceiver or the receiving unit and the sending unit may be adapted to communicate with the user equipment via an antenna.

The control unit may be implemented as a single unit or may be implemented for example as part of a standard control unit, like a CPU or a microcontroller.

According to a third aspect of the invention, there is provided a user equipment being adapted to communicate with a base station as described above and being adapted to carry out radio measurements based on the provided radio measurement configuration.

The user equipment (UE) may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiving unit or receiver which is adapted for receiving signals from the base station. The user equipment may comprise a transmitting unit for transmitting signals. The transmitting unit may be a transmitter as known by a skilled person. The receiver and the transmitting unit may be implemented as one single unit, for example as a transceiver. The transceiver or the receiver and the transmitting unit may be adapted to communicate with the base station via an antenna.

The user equipment may comprise a configuration unit for configuring the radio measurements based on the radio measurement configuration received from the base station. Such a configuration unit may be adapted to configure the user equipment to perform or carry out measurements based on the provided radio measurement configuration, taking into account the parameters and the different cell type characteristics. The configuration unit of the user equipment may be implemented for example as part of a control unit, like a CPU or a microcontroller. The configuration unit and the transceiver may be coupled or may be implemented as one single unit.

According to a fourth aspect of the invention, there is provided a cellular network system. The cellular network system comprises a base station as described above.

Generally herein, the method and embodiments of the method according to the first aspect may include performing one or more functions described with regard to the second, third or fourth aspect or an embodiment thereof. Vice versa, the base station, the user equipment or the cellular network system and embodiments thereof according to the second, third and fourth aspect may include units or devices for performing one or more functions described with regard to the first aspect or an embodiment thereof.

According to a fifth aspect of the herein disclosed subject-matter, a computer program for controlling radio measurements of a user equipment is provided, the computer program being adapted for, when executed by a data processor assembly, controlling the method as set forth in the first aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a cellular network system, a base station, a user equipment and a method of controlling radio measurements of a user equipment. It has to be pointed out that of course any combination of features relating to different aspects of the herein disclosed subject matter is also possible. In particular, some embodiments have been described with reference to apparatus type embodiments whereas other embodiments have been described with reference to method type embodiments. However, a person skilled in the art will gather from the above and the following description that, unless otherwise notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are apparent from the examples to be described hereinafter and are explained with reference to the drawings, but to which the invention is not limited.

BRIEF DESCRIPTION OF THE DRAWING

It is noted that in different figures, similar or identical elements are provided with the same reference signs.

DETAILED DESCRIPTION

In the following, embodiments of the herein disclosed subject matter are illustrated with reference to the drawings and reference to aspects of current standards, such as LTE. However, such reference to current standards is only exemplary and should not be considered as limiting the scope of the claims.

Figure 1:
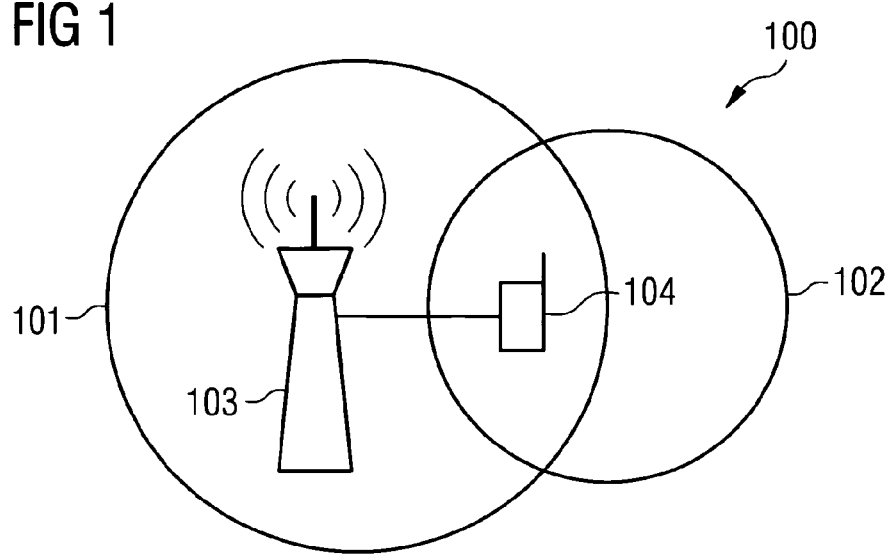
FIG. 1 shows a cellular network system according to an exemplary embodiment of the present invention.

FIG. 1 shows a cellular network system 100. A user equipment 104 is served by and located in a cell 101. The cell 101 has a first cell type characteristic. The cell 101 is served by a (serving) base station 103. The cell 101 may also be called "source cell". The cellular network system comprises at least one further cell 102. The at least one further cell 102 has a second cell type characteristic. The at least one further cell 102 is neighbored to the cell 101 and may be the target cell for a handover. The base station 103 provides a radio measurement configuration to the user equipment 104. The radio measurement configuration is indicative for parameters to be applied by the user equipment (UE) for radio measurements within the cellular network system, for instance for the target cell 102. The radio measurement configuration comprises different parameters being assigned to different cell type characteristics. This means that the UE may choose different parameters for different cells. The radio measurements of the user equipment are controlled based on the provided radio measurement configuration.

In the following, some possible implementations will be described. It should be noted that these implementations refer to a connected mode of the user equipment (i.e., a mode wherein a communication is established between the user equipment and the base station). Thus, the implementation example deals with setting of the TimeToTrigger, the mobility parameter that has some importance in mobility performance in connected mode, since it is the one delaying the handover process.

It should be noted that the herein described method and the problem solved are also applicable to enhance idle mode measurement configuration assuming that the network provides the relevant target cell specific information via broadcasted system information blocks or via user equipment specific information as part of the RRC procedures, for instance when the UE mode changes.

Common measurements in LTE may consist of following information elements (IE). The IE MeasConfig specifies measurements to be performed by the UE, and covers intra-frequency, inter-frequency and inter-RAT mobility as well as configuration of measurement gaps. The IE MeasId is used to identify a measurement configuration, i.e., linking of a measurement object and a reporting configuration. The IE MeasObjectEUTRA specifies information applicable for intra-frequency or inter-frequency E-UTRA cells. The IE MeasResults covers measured results for intra-frequency, inter-frequency and inter-RAT mobility. The IE ReportConfigEUTRA specifies criteria for triggering of an E-UTRA (or E-UTRAN) measurement reporting event.

Figure 2:
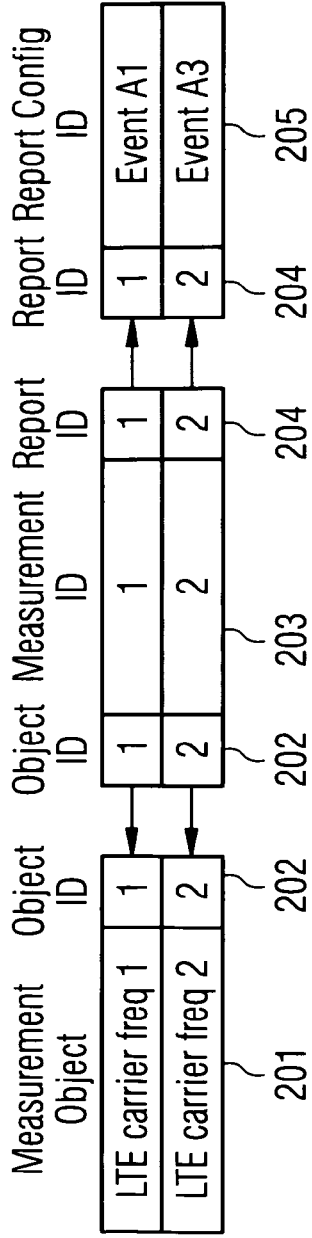
FIG. 2 shows a measurement configuration structure according to an exemplary embodiment of the present invention.
Figure 3:
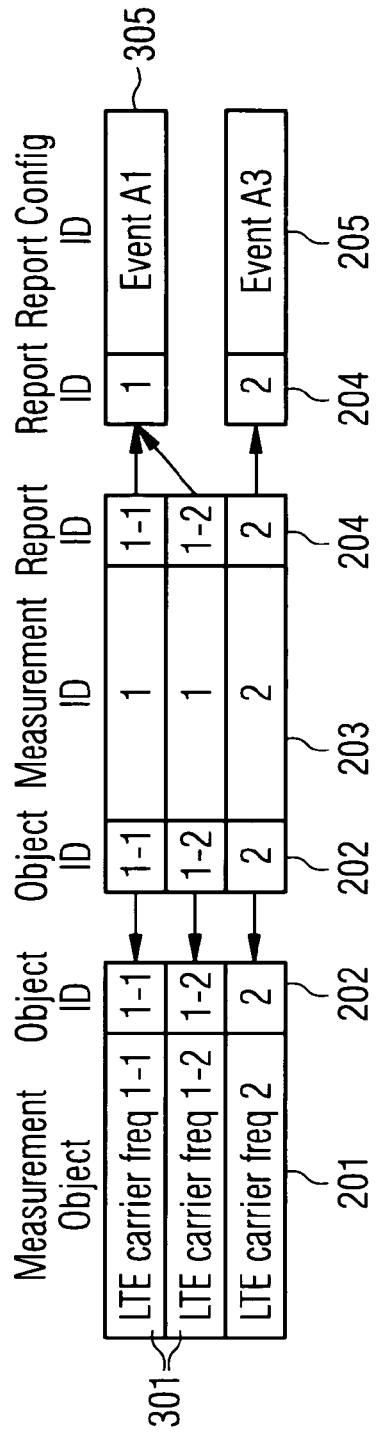
FIG. 3 shows a measurement configuration structure according to a further exemplary embodiment of the present invention.

FIG. 2 shows an example of the measurement configuration and FIG. 3 shows one way of enhancing the existing measurement configuration.

Such a radio measurement configuration comprises a plurality of measurement objects 201, for instance frequencies, with an associated object ID 202. A measurement ID 203 and a report ID 204 are associated with each object ID. Further, the report ID is associated with a report configuration ID. The measurement ID 203, the report ID 204 and the report configuration ID 205 correspond to parameters to be applied by the UE for any radio measurement.

FIG. 3 has another set of mobility parameters associated to the same frequency 301 and only the most suitable cell measurement will be reported, in this case associated to event A1 305 as an example.

One way to implement the described measurement configuration is to add fields to IE elements and keep the existing measurement configuration structure, as shown in FIG. 1. Enhanced measurement configuration may consider the relevant information elements related to measurements. At minimum (but not limited to) IE MeasConfig may contain information about the PCIs, which are associated to cell type characteristics, and IE ReportConfigEUTRA may contain the dedicated measurement parameters for each cell type characteristic, e.g. different TTT for each target cell type characteristic in connected mode. Respectively, the enhanced measurement configuration may be extended for idle mode with a list of PCIs associated with cell type characteristics and t-Reselection and Qhyst for different cell type characteristic categories respectively.

Prior to measuring the neighbouring target cells, the UE may adjust its mobility related measurement parameters based on the target cell type characteristics.

Target of the described measurement configuration is to support measurement of several target cells each having their own characteristics (capacity, coverage, small, large, macro, pico, . . . ), which may require several TTTs, e.g. at maximum there should be as many TTTs as there are neighbouring cells of different cell type characteristics indicated in the measurement configuration. At minimum, two sets of dedicated parameters are given, e.g. parameters for the coverage cell (e.g. macro) and for the cells relatively smaller than coverage cell (e.g. pico).

Another implementation can also use associations of multiple TTT values to the measurement configuration. For example two TTT values can be used where fast moving UEs are using long TTT value when measuring towards a small cell (known from the small cell type associated with a certain PCI), and otherwise using a short TTT value. This may provide the advantage that a UE can use two measurement configurations without a need for the network to reconfigure the mobility related measurements and optionally also without MSE scaling. This is advantageous as reconfiguration takes time and requires additional signalling.

If more than the allowed number of neighbouring cells is measured, only the measurements corresponding to the neighbouring cells with the larger received signal strength may be reported. Therefore the existing reporting configuration can be supported. The reporting configuration can be also extended so that the measured cell type characteristic is reported.

The serving cell may periodically broadcast the neighbouring list of PCIs and associated cell type characteristics. After receiving this list, the UE may periodically perform the appropriate measurements, where the measurements are using the target cell type characteristic specific parameters. In connected mode, the UE can be also provided with a specific measurement configuration, indicating which target cells it should measure. In connected mode, the UE may report back the results to the serving cell, optionally using the target cell specific measurement configuration.

The described method and system is targeted to complex mobility procedures where signalling and power consumption at UEs might need to be minimized. Without the described method and system, UEs need to read target cell system information blocks of every neighbouring cell to identify the target cell type (characteristic) and this may lead to draining the battery and requiring unfeasible amount of signalling to apply the optimum mobility related measurement parameters.

According to the herein described method and system, in connected mode, the UE may select the set of mobility parameters (TTT) according to target cell type characteristics, and may optionally consider the mobility state, and perform instructed measurements. Benefit may be that for example fast moving UE will not report cells which are not suitable, e.g. cells classified as small power cells. Furthermore, pedestrian users will also be supported with the same measurement configuration structure, and small power cells can be promoted over large macro cells with a hysteresis offset from the parameter set.

Currently, according to Release-8, the UE does not know if the serving cell or the target cell to be measured is a macro cell or a small power cell, and therefore TTT scaling is only making UEs to enter small cells faster. By associating "large cell" type information to macro cells and then applying suitable set of measurement parameters for mobility, the measurement may be done using correct TTT, compared to parameter scaling using MSE. MSE is rather an inaccurate method and does not provide flexible support for heterogeneous deployment.

Figure 4:
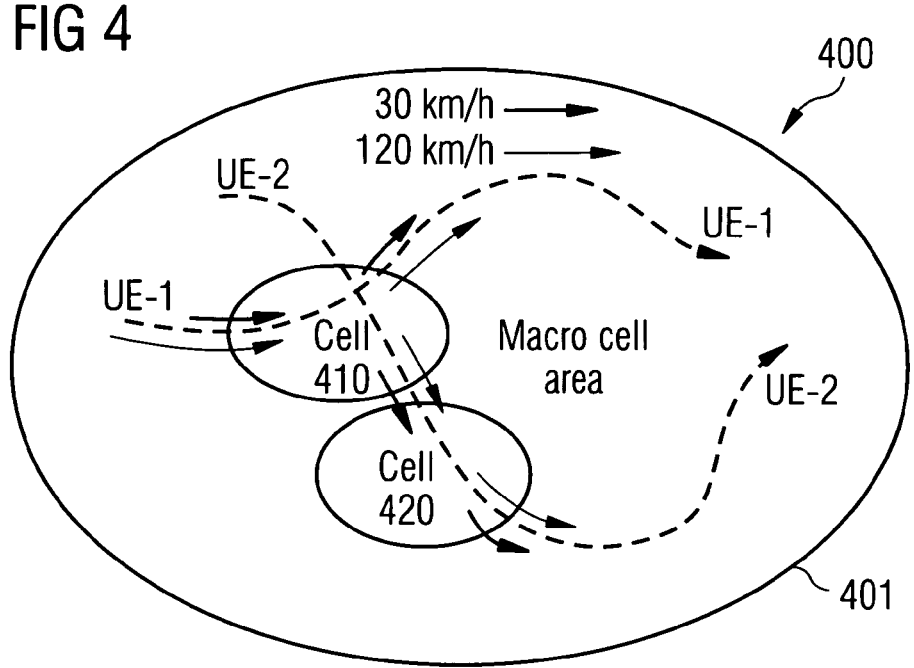
FIG. 4 shows a cellular network system according to a further exemplary embodiment of the present invention.
Figure 5:
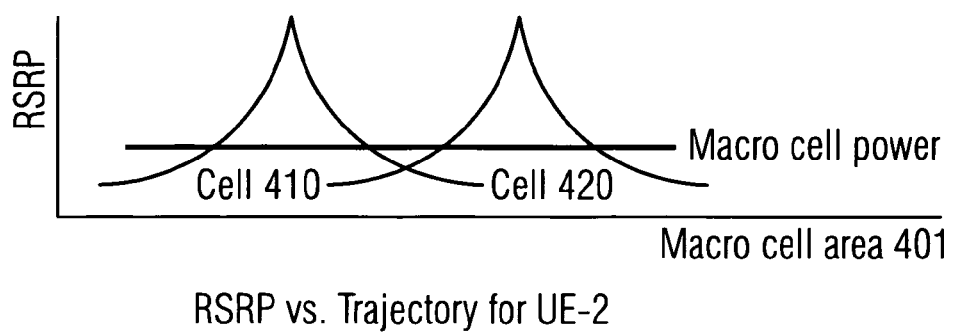
FIG. 5 shows a graph illustrating a reference signal received power of FIG. 4.

Such a scenario is shown in FIG. 4. FIG. 4 shows a cellular network system 400 with a macro cell 401 and two smaller cells 410 and 420. The corresponding RSRP graph is shown in FIG. 5. FIG. 4 illustrates an example scenario where the serving cell and target cells are characterized as "large" and "small depending on the UE trajectory". The UE may apply the set of parameter values which are specific for serving cell and target cell, and optionally consider the mobility state. In this case, the network can adapt and/or optimize its mobility and related measurement parameters (for example using SelfOrganising Network (SON) principles) either to fast moving or slowly moving users, but not for both. Therefore, measurement flexibility at the UE side by using two or more sets of measurement parameters will solve the problem of diverse user mobility profiles at a given geographical area.

Figure 6:
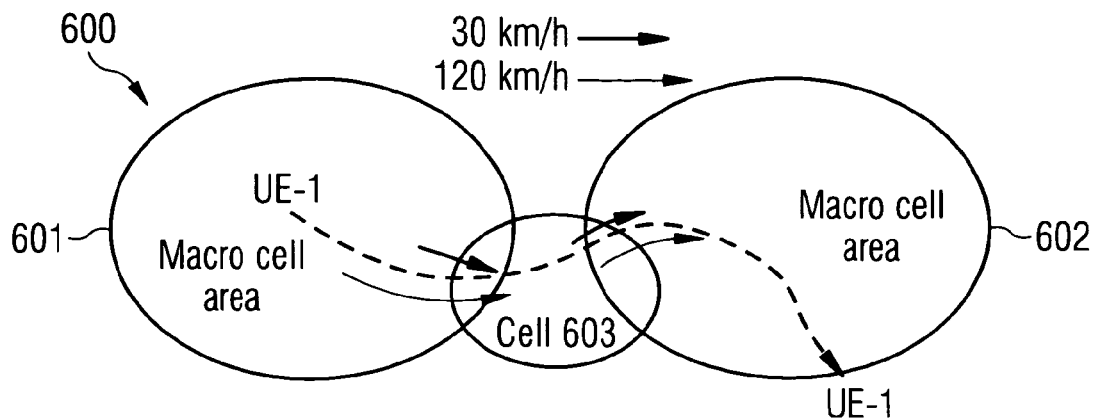
FIG. 6 shows a cellular network system according to a further exemplary embodiment of the present invention.
Figure 7:
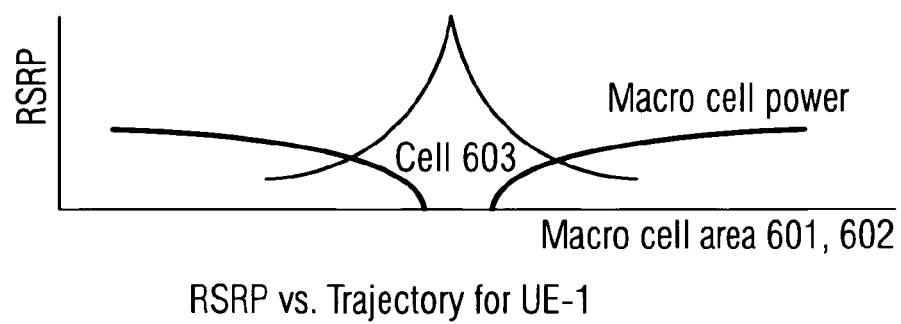
FIG. 7 shows a graph illustrating a reference signal received power of FIG. 6.

FIG. 6 shows an example scenario of a cellular network system 600, where a "smaller than macro" cell 603 fills a coverage hole between two macro cells 601, 602. In this case, a small cell can be "promoted" for mobility purposes by classifying it as "large" cell and then the UE would apply an optimum set of mobility measurement parameters without a need for additional RRC signalling or reading target cell system information blocks. Optionally the mobility state can be considered in selecting the set of mobility parameters. The corresponding RSRP graph is shown in FIG. 7.

For in-stationary and irregularly moving users the minimum of two sets of mobility measurement parameters may solve the problem related to diverse user mobility profiles and that parameters do not need to be a compromise between slowly moving and fast moving user profile. For example, for fast moving UEs, the target cell type characteristics and two sets of measurement report triggering parameters can provide a solution where the most suitable but non-best ranking cells become feasible.

The serving cell can collect information about its neighbours using X2 or S1 interface and communicate the neighbour cell list with cell type characteristics to the UE for example with each handoff, or the source cell can broadcast the information to all UEs in SIB, such that a fast UE excludes the measurement and reporting of small cells. This decreases radio link failure and handover failure probability, increases cell reselection likelihood to more suitable cells and improves UE battery life.

Figure 8:
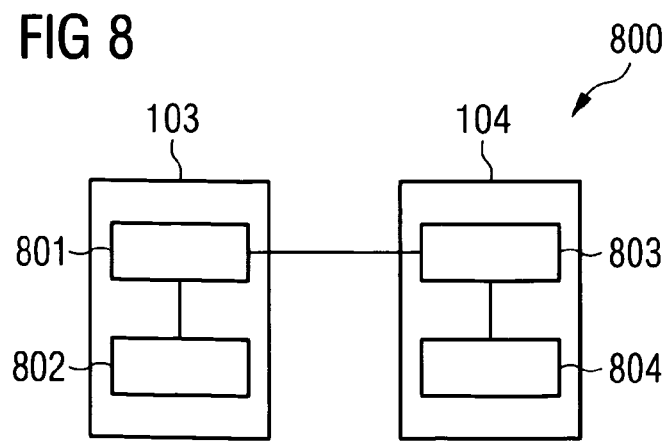
FIG. 8 shows a base station and a user equipment within a cellular network system according to an exemplary embodiment of the invention.

FIG. 8 shows a cellular network system 800 according to an exemplary embodiment of the invention. The cellular network system comprises a base station 103 and a user equipment 104 being served by the base station in a cell.

The base station may be any type of access point or point of attachment, which is capable of providing a wireless access to a cellular network system. Thereby, the wireless access may be provided for the user equipment or for any other network element, which is capable of communicating in a wireless manner. The base station may be an eNodeB, eNB, home NodeB or HNB, or any other kind of access point.

The base station may comprise a receiving unit, for example a receiver as known by a skilled person. The base station may also comprise a transmitting or sending unit, for example a transmitter. The receiver and the transmitter may be implemented as one single unit, for example as a transceiver 801. The transceiver or the receiving unit and the sending unit may be adapted to communicate with the user equipment via an antenna.

The transmitting unit or the transceiver 801 are adapted to provide a radio measurement configuration to the user equipment 104, wherein the radio measurement configuration is indicative for parameters to be applied by the user equipment for radio measurements. The radio measurement configuration comprises different parameters being assigned to different cell type characteristics.

The base station further comprises a control unit 802 for controlling the radio measurements of the user equipment based on the provided radio measurement configuration. The control unit may be implemented as a single unit or may be implemented for example as part of a standard control unit, like a CPU or a microcontroller.

The user equipment (UE) may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiving unit or receiver which is adapted for receiving signals from the base station. The user equipment may comprise a transmitting unit for transmitting signals. The transmitting unit may be a transmitter as known by a skilled person. The receiver and the transmitting unit may be implemented as one single unit, for example as a transceiver 803. The transceiver or the receiver and the transmitting unit may be adapted to communicate with the base station via an antenna.

The user equipment may comprise a configuration unit 804 for configuring the radio measurements based on the radio measurement configuration received from the base station. The configuration unit of the user equipment may be implemented for example as part of a control unit, like a CPU or a microcontroller. The configuration unit and the transceiver may be coupled or may be implemented as one single unit.

Having regard to the subject matter disclosed herein, it should be mentioned that, although some embodiments refer to a "base station", "eNB", etc., it should be understood that each of these references is considered to implicitly disclose a respective reference to the general term "network component" or, in still other embodiments, to the term "network access node". Also other terms which relate to specific standards or specific communication techniques are considered to implicitly disclose the respective general term with the desired functionality.

It should further be noted that a base station as disclosed herein is not limited to dedicated entities as described in some embodiments. Rather, the herein disclosed subject matter may be implemented in various ways in various locations in the communication network while still providing the desired functionality.

According to embodiments of the invention, any suitable entity (e.g. components, units and devices) disclosed herein, e.g. the control unit, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularities on device level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein.

It should be noted that the term "comprising" does not exclude other elements or steps. It may also be possible in further refinements of the invention to combine features from different embodiments described herein above. It should also be noted that reference signs in the claims should not be construed as limiting the scope of the claims.

LIST OF REFERENCE SIGNS

100 Cellular network system
101 Cell
102 Further cell
103 Base station
104 User equipment
201 Measurement object
202 Object ID
203 Measurement ID
204 Report ID 205 Report Configuration ID
301 Measurement object
305 Report Configuration ID
400 Cellular network system
401 Macro cell
410 Smaller cell
420 Smaller cell
600 Cellular network system
601 Macro cell
602 Macro cell
603 Smaller cell
800 Cellular network system
801 Transceiver of base station
802 Control unit of base station
803 Transceiver of user equipment
804 Configuration unit of user equipment

The invention claimed is:

1. A method for controlling radio measurements of a user equipment within a cellular network system, wherein the user equipment is served by a cell of a first cell type characteristic, the cell being assigned to a base station, wherein the cellular network system comprises the cell and at least one further cell of a second cell type characteristic, the method comprising:
providing, by the base station, a radio measurement configuration to the user equipment, wherein the radio measurement configuration is indicative for sets of parameters to be applied by the user equipment for radio measurements, the radio measurement configuration comprising at least two different sets of parameters being assigned to different cell type characteristics for a same frequency, and
controlling the radio measurements of the user equipment based on the provided radio measurement configuration at least by configuring the user equipment to apply one of the at least two sets of different parameters for the radio measurements,
wherein the radio measurement configuration comprises a list comprising information of the at least one further cell and the associated cell type characteristic, and wherein the list comprises information about a plurality of neighboring cells and the respective associated cell type characteristic, and wherein the cell type characteristics comprise at least one of the group consisting of cell type, cell coverage, cell capacity, cell size, cell weight, and cell priority.

2. The method as set forth in claim 1, further comprising receiving, by the base station, radio measurements from the user equipment, wherein the radio measurements are based on the provided radio measurement configuration, and
scheduling a handover operation of the user equipment from the cell to the further cell based on the transmitted radio measurements.

3. The method as set forth in claim 1, wherein the radio measurement configuration comprises a table having the cell type characteristics and the assigned parameters.

4. The method as set forth in claim 1, wherein the parameters are indicative for the measurement behavior and/or the reporting behavior of the user equipment.

5. The method as set forth in claim 1, wherein controlling the radio measurements of the user equipment is based on the list and the parameters.

6. The method as set forth in claim 1, wherein controlling the radio measurements of the user equipment is based on the provided radio measurement configuration and a classification state of the user equipment.

7. The method as set forth in claim 6, wherein the classification state of the user equipment corresponds to a mobility state and is determined by applying mobility state estimation.

8. The method of claim 1, wherein controlling the radio measurements comprises configuring the user equipment to apply the parameters for radio measurements based on a respective cell type characteristic.

9. The method of claim 1, wherein each of the at least two sets of different parameters comprises a different value for a time to trigger parameter.

10. A base station for controlling radio measurements of a user equipment within a cellular network system, wherein the user equipment is served by a cell of a first cell type characteristic, the cell being assigned to the base station, wherein the cellular network system comprises the cell and at least one further cell of a second cell type characteristic, the base station comprising:
at least one processor;
at least one memory including computer program code;
the at least one memory and the computer program code configured to, with the at least one processor, cause the base station at least to:
provide a radio measurement configuration to the user equipment, wherein the radio measurement configuration is indicative for sets of parameters to be applied by the user equipment for radio measurements, the radio measurement configuration comprising at least two different sets of parameters being assigned to different cell type characteristics of a same frequency, and
control the radio measurements of the user equipment based on the provided radio measurement configuration,
wherein the radio measurement configuration comprises a list comprising information of the at least one further cell and the associated cell type characteristic and wherein the list comprises information about a plurality of neighboring cells and the respective associated cell type characteristic, and wherein the cell type characteristics comprise at least one of the group consisting of cell type, cell coverage, cell capacity, cell size, cell weight, and cell priority.

11. A user equipment being adapted to communicate with the base station as set forth in claim 10 and being adapted to carry out radio measurements based on the provided radio measurement configuration.

12. A cellular network system, the cellular network system comprising a base station as set forth in claim 10.

13. The base station for controlling radio measurements as set forth in claim 10, wherein the at least one memory and the computer program code configured to, with the at least one processor, cause the base station at least to:
receive radio measurements from the user equipment, wherein the radio measurements are based on the provided radio measurement configuration, and schedule a handover operation of the user equipment from the cell to the further cell based on the transmitted radio measurements.

14. The base station for controlling radio measurements as set forth in claim 10, wherein the radio measurement configuration comprises a table having the cell type characteristics and the assigned parameters.

15. The base station for controlling radio measurements as set forth in claim 10, wherein the parameters are indicative for the measurement behavior and/or the reporting behavior of the user equipment.

16. The base station for controlling radio measurements as set forth in claim 10, wherein controlling the radio measurements of the user equipment is based on the list and the parameters.

17. The base station for controlling radio measurements as set forth in claim 10, wherein controlling the radio measurements comprises configuring the user equipment to apply the parameters for radio measurements based on a respective cell type characteristic.

18. A non-transitory computer readable medium comprising computer readable instructions for controlling radio measurements of a user equipment within a cellular network system, wherein the user equipment is served by a cell of a first cell type characteristic, the cell being assigned to a base station, wherein the cellular network system comprises the cell and at least one further cell of a second cell type characteristic, the program instructions executable by a device to cause the device to:

provide, by the base station, a radio measurement configuration to the user equipment, wherein the radio measurement configuration is indicative for sets of parameters to be applied by the user equipment for radio measurements, the radio measurement configuration comprising at least two different sets of parameters being assigned to different cell type characteristics for a same frequency, and control the radio measurements of the user equipment based on the provided radio measurement configuration at least by configuring the user equipment to apply one of the at least two sets of different parameters for the radio measurements, wherein the radio measurement configuration comprises a list comprising information of the at least one further cell and the associated cell type characteristic and wherein the list comprises information about a plurality of neighboring cells and the respective associated cell type characteristic, and wherein the cell type characteristics comprise at least one of the group consisting of cell type, cell coverage, cell capacity, cell size, cell weight, and cell priority.

* * * * *